(12) United States Patent
White et al.

(10) Patent No.: US 8,374,792 B2
(45) Date of Patent: Feb. 12, 2013

(54) SYSTEM AND METHOD FOR MULTI-RESOLUTION ROUTING

(75) Inventors: Dane White, Seattle, WA (US); Erik Freed, New Brighton, MN (US)

(73) Assignee: Primordial Inc., Saint Paul, MN (US)

( * ) Notice: Subject to any disclaimer, the term of this patent is extended or adjusted under 35 U.S.C. 154(b) by 221 days.

(21) Appl. No.: 12/847,845

(22) Filed: Jul. 30, 2010

(65) Prior Publication Data

US 2012/0029804 A1 Feb. 2, 2012

(51) Int. Cl.
*G01C 21/34* (2006.01)

(52) U.S. Cl. ........................................................ 701/533

(58) Field of Classification Search ........................ None
See application file for complete search history.

(56) References Cited

U.S. PATENT DOCUMENTS

| | | | | |
|---|---|---|---|---|
| 5,030,117 A * | 7/1991 | Delorme | ........................ | 434/130 |
| 5,031,104 A * | 7/1991 | Ikeda et al. | ........................ | 701/428 |
| 5,475,387 A | 12/1995 | Matsumoto | | |
| 5,506,779 A * | 4/1996 | Kanki | ........................ | 701/533 |
| 5,684,704 A * | 11/1997 | Okazaki | ........................ | 701/533 |
| 5,899,955 A * | 5/1999 | Yagyu et al. | ........................ | 701/533 |
| 5,910,177 A * | 6/1999 | Zuber | ........................ | 701/411 |
| 5,938,720 A * | 8/1999 | Tamai | ........................ | 701/533 |
| 6,102,958 A * | 8/2000 | Meystel et al. | ........................ | 703/2 |
| 6,192,314 B1 * | 2/2001 | Khavakh et al. | ........................ | 701/410 |
| 6,195,611 B1 * | 2/2001 | Sakamoto et al. | ........................ | 701/533 |
| 6,269,303 B1 * | 7/2001 | Watanabe et al. | ........................ | 701/410 |
| 6,269,305 B1 * | 7/2001 | Yamashita et al. | ........................ | 701/533 |
| 6,388,582 B2 * | 5/2002 | Yamashita et al. | ........................ | 340/988 |
| 6,448,908 B1 * | 9/2002 | Hijikata | ........................ | 340/995.19 |
| 6,700,505 B2 * | 3/2004 | Yamashita et al. | ........................ | 340/988 |
| 6,785,608 B1 * | 8/2004 | Milici et al. | ........................ | 701/533 |
| 6,963,800 B1 * | 11/2005 | Milbert | ........................ | 701/533 |
| 7,356,405 B1 * | 4/2008 | Nesbit | ........................ | 701/533 |
| 7,474,960 B1 * | 1/2009 | Nesbitt | ........................ | 701/533 |
| 7,702,454 B2 * | 4/2010 | Nesbitt | ........................ | 701/426 |
| 7,756,635 B2 * | 7/2010 | Milbert | ........................ | 701/416 |
| 7,818,116 B1 * | 10/2010 | Nesbitt | ........................ | 701/412 |
| 8,014,941 B2 * | 9/2011 | Nagel et al. | ........................ | 701/423 |

(Continued)

FOREIGN PATENT DOCUMENTS

WO   WO 2010005424 A1 *   1/2010

OTHER PUBLICATIONS

GB1019536.0 Search Report of Mar. 14, 2011.

(Continued)

*Primary Examiner* — Khoi Tran
*Assistant Examiner* — Adam Mott
(74) *Attorney, Agent, or Firm* — Carlos R. Villamar; The Villamar Firm PLLC

(57) ABSTRACT

A system, method and computer program product for efficiently generating on- and off-road travel routes using multi-resolution maps including a map generator (108), map database (106), route generator (100), heuristic generator (102), and search envelope factor generator (104). The map generator (108) converts input raster and vector map data into output multi-resolution raster map data suitable for routing and stores it in the map database (106). The route generator (100) uses the map database (106) to produce a route at a coarse zoom level and then regenerate the route at progressively higher zoom levels. The heuristic generator (102) penalizes high resolution routes that deviate too far from one or more low resolution routes. The search envelope factor generator (104) computes this penalty based on the distance from a given search graph node to the low resolution routes.

15 Claims, 10 Drawing Sheets

U.S. PATENT DOCUMENTS

| | | | |
|---|---|---|---|
| 8,150,620 B2* | 4/2012 | Motoyama | 701/410 |
| 8,175,801 B2* | 5/2012 | Tu et al. | 701/410 |
| 2006/0095171 A1* | 5/2006 | Whittaker et al. | 701/25 |
| 2006/0116814 A1* | 6/2006 | Milbert | 701/209 |
| 2007/0253640 A1* | 11/2007 | Brett | 382/276 |
| 2008/0167771 A1* | 7/2008 | Whittaker et al. | 701/26 |
| 2008/0189032 A1* | 8/2008 | Beadman | 701/208 |
| 2009/0125229 A1* | 5/2009 | Peri et al. | 701/201 |
| 2009/0164111 A1* | 6/2009 | Hosoi et al. | 701/200 |
| 2010/0063731 A1* | 3/2010 | Milbert et al. | 701/211 |
| 2010/0100309 A1* | 4/2010 | Hosoi et al. | 701/200 |
| 2010/0211244 A1 | 8/2010 | Jeong et al. | |
| 2010/0274487 A1* | 10/2010 | Neff et al. | 701/302 |
| 2011/0098914 A1* | 4/2011 | Milbert et al. | 701/200 |
| 2011/0251783 A1* | 10/2011 | Doi | 701/200 |
| 2012/0029804 A1* | 2/2012 | White et al. | 701/200 |

OTHER PUBLICATIONS

Jonsson, "An optimal pathfinder for vehicles in real-world digital terrain maps," published 1997, section 4.3.

Stuart Russell and Peter Norvig, "Artificial Intelligence: A Modern Approach," Third Edition, Dec. 11, 2009, pp. 93 to 99.

Maxim Likhachev, Geoff Gordon, and Sebastian Thrun, "ARA*: Anytime A* with Provable Bounds on Sub-Optimality" in Advances in Neural Information Processing Systems 16: Proceedings of the 2003 Conference.

* cited by examiner

SYSTEM AND METHOD FOR MULTI-RESOLUTION ROUTING

FIELD OF THE INVENTION

This invention relates to navigation, specifically to efficiently generating on- and off-road travel routes using multi-resolution maps.

DISCUSSION OF THE BACKGROUND

U.S. Pat. Nos. 6,963,800 ("Routing soldiers around enemy attacks and battlefield obstructions") and 7,756,635 ("Method and System for Generating and Presenting Off-Road Travel Routes") by Randy Milbert pioneered automated off-road route planning. They enabled soldiers and civilians alike to plan routes through any terrain—desert, jungle, mountainous, urban, or woodland—on- or off-road.

Whereas on-road route planning is limited to a relatively sparse graph—one can only go left, right, or straight at a typical intersection—off-road route planning leads to immensely denser graphs because one has 360 degrees of freedom at every point.

An exemplary embodiment described in U.S. Pat. Nos. 6,963,800 and 7,756,635 uses A* (see pages 93 to 99 of "Artificial Intelligence: A Modern Approach, Third Edition" by Stuart Russell and Peter Norvig) to generate these off-road routes. A*'s computational speed and memory usage are vastly superior to many alternative path finding algorithms such as breadth- and depth-first search, but A* is still unable to quickly generate high-quality, long off-road routes on resource-constrained platforms such as mobile phones and personal navigation devices (PNDs).

Memory-bounded variants of A* (see pages 101 to 102 of "Artificial Intelligence: A Modern Approach, Third Edition") such as simplified memory-bounded A* (SMA*) reduce memory consumption and maintain optimality given an admissible heuristic, but they sacrifice performance. All nodes explored by A* are also explored by SMA*, it is just that some of them may be temporarily removed from memory on resource-constrained platforms.

Anytime variants of A* such as Anytime Repairing A* (ARA*) (see "ARA*: Anytime A* with Provable Bounds on Sub-Optimality" by Maxim Likhachev, Geoff Gordon, and Sebastian Thrun) also reduce memory consumption and maintain optimality given an admissible heuristic, but they too sacrifice performance if allowed to run to completion. In that case, ARA* explores at least as many nodes as A*. Its benefit is that it enables one to obtain suboptimal routes with bounded errors while route generation progresses.

Another approach (see "An optimal pathfinder for vehicles in real-world digital terrain maps" by F. Markus Jönsson) creates a sub-sampled version of the graph, generates a coarse route, divides the coarse route into segments, generates fine routes using the segment end points, and then stitches the fine routes together. Again, this solution reduces memory consumption. In some cases, it also reduces computation time because it is quicker to generate several short route segments rather than one long complete route. This approach has a significant disadvantage, however, in that it produces routes with tie points where the fine routes were drawn to coarse segment end points, which may be in undesirable terrain.

None of these existing solutions is capable of quickly generating high-quality, long off-road routes on resource-constrained platforms.

SUMMARY OF THE INVENTION

The present invention is a computer-implemented method for efficiently generating on- and off-road travel routes using multi-resolution maps. An exemplary embodiment of the invention includes a map generator, map database, route generator, heuristic generator, and search envelope factor generator.

An exemplary embodiment of the map generator converts input raster and vector map data into output multi-resolution raster map data suitable for routing. If the input vector map data contains linear features that affect routing (e.g. fences, roads, streams, and trails), the map generator draws these features with a fixed width at all zoom levels in the output raster map data.

An exemplary embodiment of the route generator produces a route at a coarse zoom level and then regenerates the route at progressively higher zoom levels. At these higher zoom levels, the route generator uses the route generated at the previous zoom level to limit the scope of the search at the current zoom level. Specifically, the route generator penalizes candidate routes at the current zoom level that deviate too far from the route generated at the previous zoom level. The result is decreased computation time and memory usage. The route generator uses a well-known, heuristic-based path finding algorithm such as A* to generate the routes.

An exemplary embodiment of the heuristic generator calculates the heuristic used by the path finding algorithm. At the initial zoom level, the heuristic generator produces a value based on the distance between the current node and the goal node as well as a minimum cost between adjacent nodes. At higher zoom levels, the heuristic generator additionally accounts for a search envelope factor.

An exemplary embodiment of the search envelope factor generator calculates this factor. It computes the distance from the current node to the bias route (i.e. the route generated at the previous zoom level) as a node count and then computes a factor that results in increasing heuristic values for nodes that fall outside of the search envelope surrounding the bias route. In an exemplary embodiment, the search envelope is a fixed-width area surrounding the bias route such that the search is admissible inside the envelope and inadmissible elsewhere.

Advantageously, unlike the background art, the present invention is capable of quickly generating high-quality, long off-road routes on resource-constrained platforms. Also, the present invention enables one to make tradeoffs between route quality and computation time/memory usage by narrowing or widening the search envelope. Also, the present invention improves routing at coarse zoom levels by including narrow land cover features that affect routing (e.g. fences, roads, streams, and trails) in all map resolutions.

Accordingly, in exemplary aspects of the present invention there is provided a system, method and computer program product for generating a travel route, including a map generator for generating maps at multiple zoom levels; and a route generator for generating a high resolution route based upon one or more low resolution routes determined from the maps generated by the map generator.

The route generator biases the high resolution route in favor of the low resolution routes with a bias that varies with distance to the low resolution routes.

The route generator's graph search is biased toward nodes that are closer to the low resolution routes.

The route generator favors candidate high resolution routes that fall within a search envelope surrounding the low resolution routes.

The search envelope's dimensions depend on the current zoom level.

The system, method and computer program product further including a heuristic generator that favors candidate high resolution routes that are near the low resolution routes.

The heuristic generator biases the high resolution route in favor of the low resolution routes with a bias that varies with distance to the low resolution routes.

The heuristic generator's graph search is biased toward nodes that are closer to the low resolution routes.

The heuristic generator favors candidate high resolution routes that fall within a search envelope surrounding the low resolution routes.

The search envelope's dimensions depend on the current zoom level.

The map generator enlarges map features at lower zoom levels to improve routing.

The route generator biases the high resolution route in favor of the low resolution routes with a bias that varies with distance to the low resolution routes.

The route generator's graph search is biased toward nodes that are closer to the low resolution routes.

The route generator favors candidate high resolution routes that fall within a search envelope surrounding the low resolution routes.

The search envelope's dimensions depend on the current zoom level.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION

Figure 1:
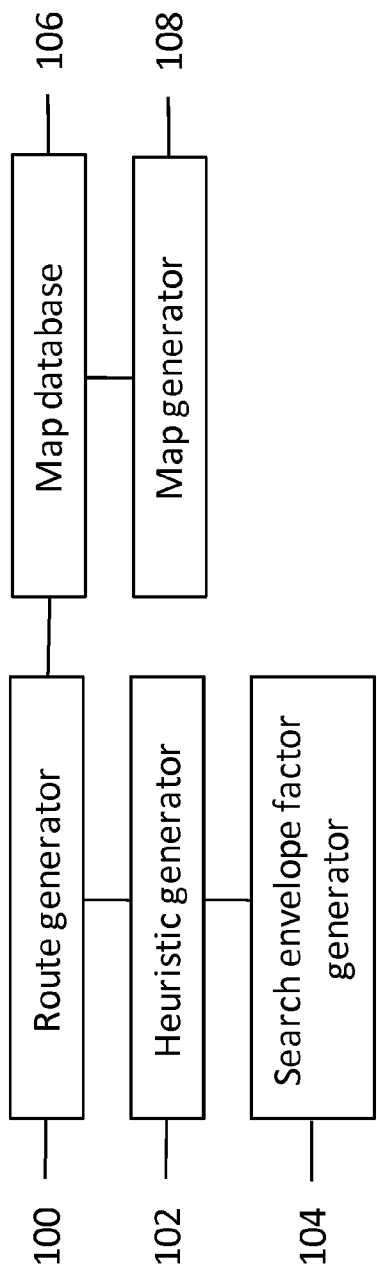
FIG. 1: Overall multi-resolution routing system

FIG. 1 shows an exemplary embodiment of the present invention. The map generator 108 converts input raster and vector map data into output multi-resolution raster map data suitable for routing and stores it in the map database 106. The route generator 100 generates a route at a coarse zoom level and then refines it at higher zoom levels, using previous routes to limit the search. The route generator 100 uses a well-known, heuristic-based path finding algorithm such as A*. The heuristic generator 102 produces heuristic values used by the path planning algorithm. At the initial zoom level, the heuristic generator 102 returns values derived from the current node's distance to the goal and a minimum cost between adjacent nodes. At higher zoom levels, the heuristic generator 102 also takes into account a search envelope that penalizes nodes far away from the bias route generated at the previous zoom level. To compute this penalty, the heuristic generator 102 relies on a search envelope factor generator 104. The search envelope factor generator 104 returns a value of 1 if node is within the search envelope or a higher value if a node is outside of the search envelope. Nodes further away from the search envelope have higher search envelope factors. The result is that the route generator 108 spends little time exploring nodes outside of the search envelope surrounding the route generated at the previous zoom level.

Figure 2:
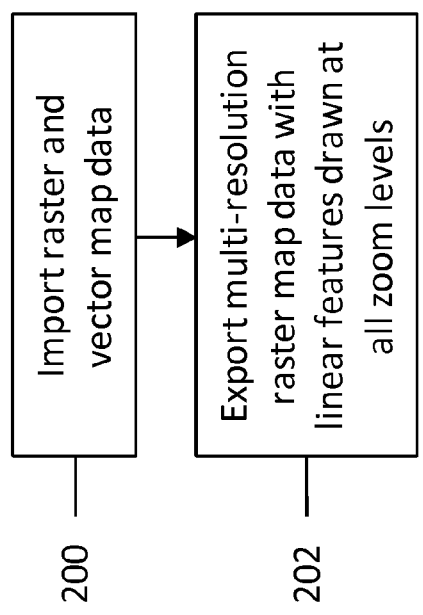
FIG. 2: Map generator

FIG. 2 shows an exemplary embodiment of the map generator 108. The map generator 108 converts input raster and vector map data into output multi-resolution raster map data suitable for routing and stores it in the map database 106. Typically, the input map data includes a raster elevation map and a vector land cover map. The raster elevation map indicates the height of the land at each point on the map. The vector land cover map indicates the type of terrain (e.g. field, forest, road, or water) at each point on the map. The map generator 108 converts this input raster and vector map data into output multi-resolution map data suitable for routing. To preserve the land cover map's unique colors at coarser resolutions, the map generator 108 uses nearest neighbor resampling. The map generator 108 draws linear features in the input vector land cover data that affect routing such as fences, roads, streams, and trails at all zoom levels in the output raster data. This has the effect of enlarging certain map features at lower zoom levels, which improves routing. One can use a third-party geographic information system (GIS) tool such as Global Mapper or ESRI ArcGIS to accomplish this. Using Global Mapper, one can configure the application to draw linear features at all zoom levels with the same thickness (e.g. two pixels). One can then export multi-resolution raster data in a variety of formats including Google or Microsoft tile sets. The map generator 108 stores this output raster data in the map database 106.

In an exemplary embodiment, the map database 106 contains 256 by 256-pixel tiles stored in a portable network graphics (PNG) format. These tiles conform to standards developed by Google (see "Google Maps Overlays" available on the World Wide Web at code.google.com/apis/maps/) and Microsoft (see "Bing Maps Tile System" available on the World Wide Web at msdn.microsoft.com/en-us/library/bb259689.aspx) for their online maps. Both of these standards start with a single tile covering the globe at the coarsest map resolution—zoom level 0. At each subsequent zoom level, they divide one tile into four. Therefore, zoom level 1 has 4 tiles covering the globe, zoom level 2 has 16 tiles covering the globe, etc.

For details on generating a routable raster map, see U.S. Pat. Nos. 6,963,800 and 7,756,635.

Figure 3:
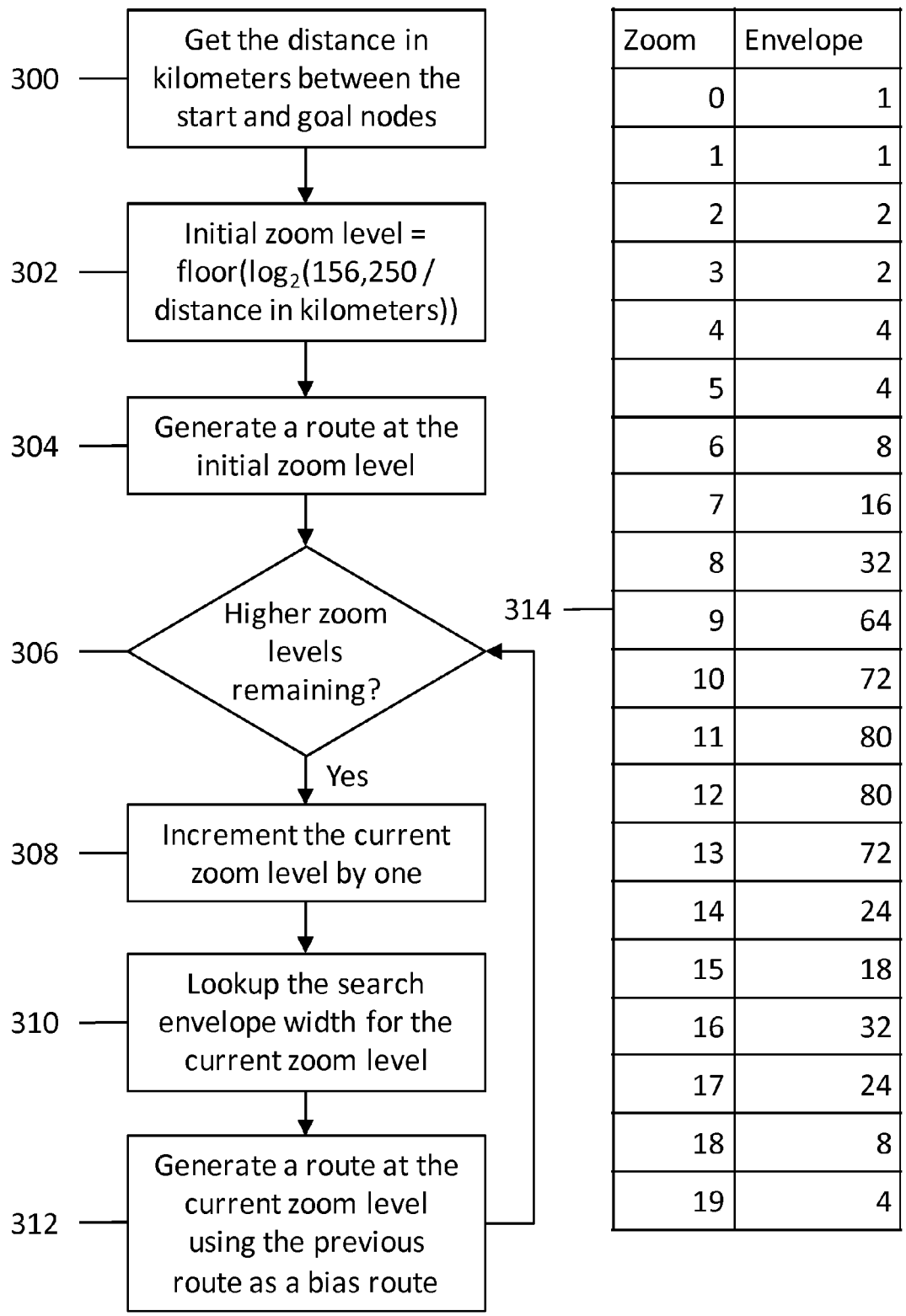
FIG. 3: Route generator

FIG. 3 shows an exemplary embodiment of the route generator 100. At step 300, the route generator 100 gets the distance in kilometers between the start and goal nodes. At step 302, the route generator 100 computes an initial zoom level using the following equation:

$$\text{Initial zoom level} = \text{floor}(\log_2(156{,}250/\text{distance in kilometers}))$$

For example, if the straight-line distance between a route's start and goal nodes is 5 kilometers, the initial zoom level is:

$$\text{Initial zoom level} = \text{floor}(\log_2(156{,}250/5)) = 14$$

At step 304, the route generator 100 generates a route at the initial zoom level. To achieve this, an exemplary embodiment of the route generator 100 uses the heuristic-based A* algorithm. The heuristic generator 102 supplies heuristic values and the map database 106 supplies routable map tiles for the current zoom level. At step 306, the route generator 100 queries the map database 106 to determine if higher resolution maps are available. If so, at step 308, the route generator 100 increments the current zoom level by one (e.g. advancing from initial zoom level 14 to current zoom level 15). At step 310, the route generator 100 gets the appropriate search envelope width for the current zoom level from the search envelope lookup table 314 (e.g. for zoom level 15, the search envelope width is 18 nodes). At step 312, the route generator 100 produces a route at the current zoom level using this search envelope width and the route generated at the previous zoom level as a bias route, which will effectively limit the search area. Again, the route generator 100 relies on A* to generate the route. This time, however, the heuristic additionally includes a search envelope factor that penalizes nodes outside of the search envelope surrounding the bias route. When step 312 completes, execution returns to step 306 to determine if there are higher resolution maps remaining.

One skilled in the art will recognize that the present invention applies to many path finding algorithms—not just A*. Other heuristic-based path planning algorithms include greedy best-first search, iterative deepening A* (IDA*), recursive best-first search (RBFS), memory-bounded A* (MA*), simple memory-bounded A* (SMA*), anytime repairable A* (ARA*), and anytime D*.

One skilled in the art will recognize that the equation for computing an initial zoom level at step 302 could be replaced by a lookup table or a different equation that returned a low initial zoom level for a long route and a high initial zoom level for a short route.

One skilled in the art will recognize that the search envelope lookup table 314 could be tuned for various applications. For example, one might reduce the search envelope widths to reduce computation time and memory consumption on resource-constrained platforms. Also, one might replace the search envelope lookup table 314 with an equation mapping a zoom level to an appropriate search envelope width.

Figure 4:
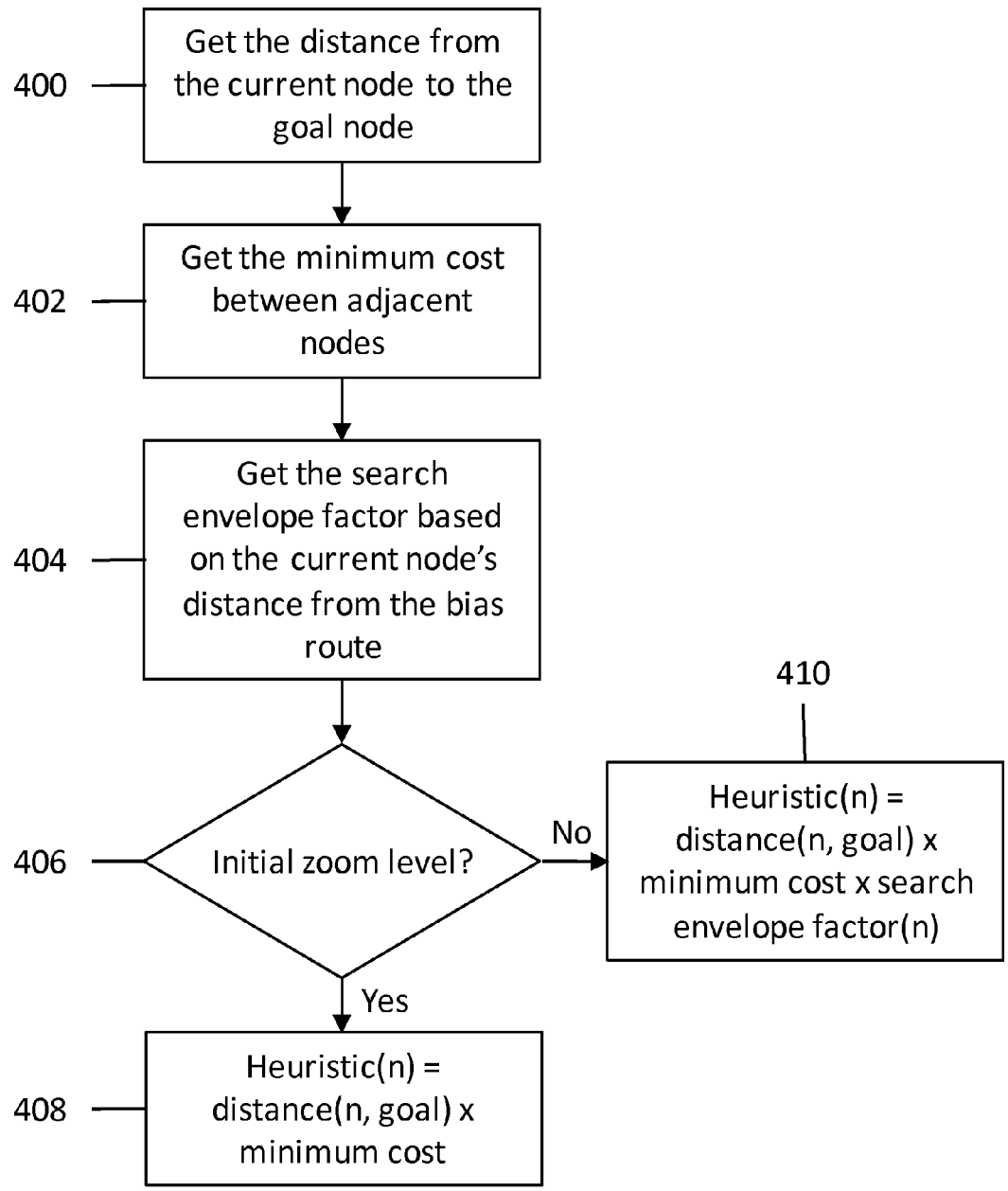
FIG. 4: Heuristic generator

FIG. 4 shows an exemplary embodiment of the heuristic generator 102. At step 400, the heuristic generator 102 gets the distance from the current node to the goal node as a node count. At step 402, the heuristic generator 102 gets the minimum cost between adjacent nodes. At step 404, the heuristic generator 102 gets the search envelope factor from the search envelope factor generator 104. At step 406, the heuristic generator 102 determines whether the system is generating a route at an initial zoom level. If so, it calculates the heuristic as follows (where n represents the current node and goal represents the goal node):

$$\text{Heuristic}(n) = \text{distance}(n, \text{goal}) \times \text{minimum cost between adjacent nodes}$$

Otherwise, the heuristic generator 102 calculates the heuristic as follows:

$$\text{Heuristic}(n) = \text{distance}(n, \text{goal}) \times \text{minimum cost between adjacent nodes} \times \text{search envelope factor}(n)$$

Figure 5:
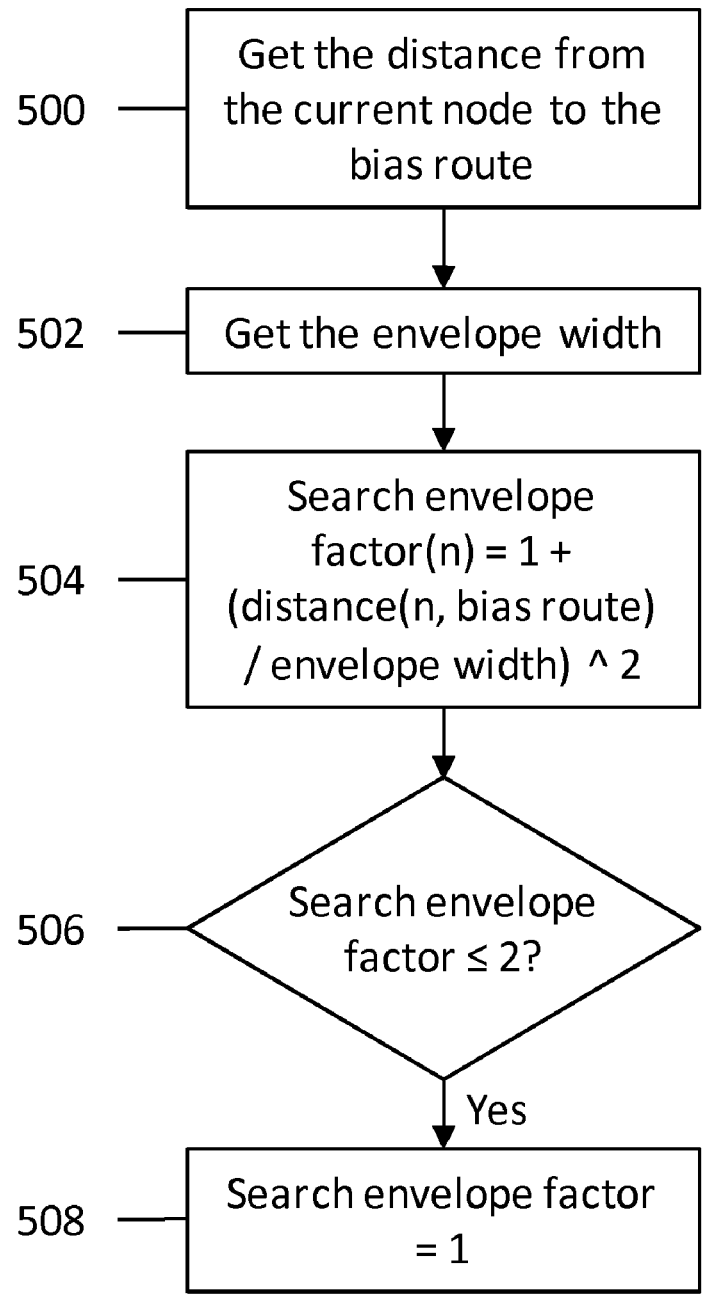
FIG. 5: Search envelope factor generator

FIG. 5 shows an exemplary embodiment of the search envelope factor generator 104. At step 500, the search envelope factor generator 104 gets the distance from the current node to the bias route (i.e. the route generated at the previous zoom level) as a node count. At step 502, the search envelope factor generator 104 gets the search envelope width from the route generator 100. At step 504, the search envelope factor generator 104 calculates the search envelope factor using the following equation (where n represents the current node):

$$\text{Search envelope factor}(n) = 1 + (\text{distance}(n, \text{bias route}) / \text{search envelope width})^2$$

At step 506, the search envelope factor generator 104 determines whether the computed search envelope factor is less than or equal to 2. If so, at step 508, the search envelope factor generator 104 sets the search envelope factor to 1. This ensures that nodes within the search envelope or on its edge are not penalized with higher costs. Nodes outside of the search envelope, however, are penalized with costs that increase as the bias route distance increases.

One skilled in the art will recognize that any formula for adjusting the heuristic which is small near the bias route, but then becomes increasingly large far away, could potentially be used.

To better understand the present invention (a multi-resolution routing system), it is helpful to compare it to a single-resolution routing system such as the one described in U.S. Pat. Nos. 6,963,800 and 7,756,635. Exemplary embodiments of both routing systems leverage the heuristic-based A* algorithm. The single-resolution routing system uses a heuristic incorporating a node's distance to the goal and the minimum cost between adjacent nodes. The multi-resolution routing system's heuristic adds a search envelope factor based on a node's proximity to a bias route generated at a previous zoom level.

Figure 6A:
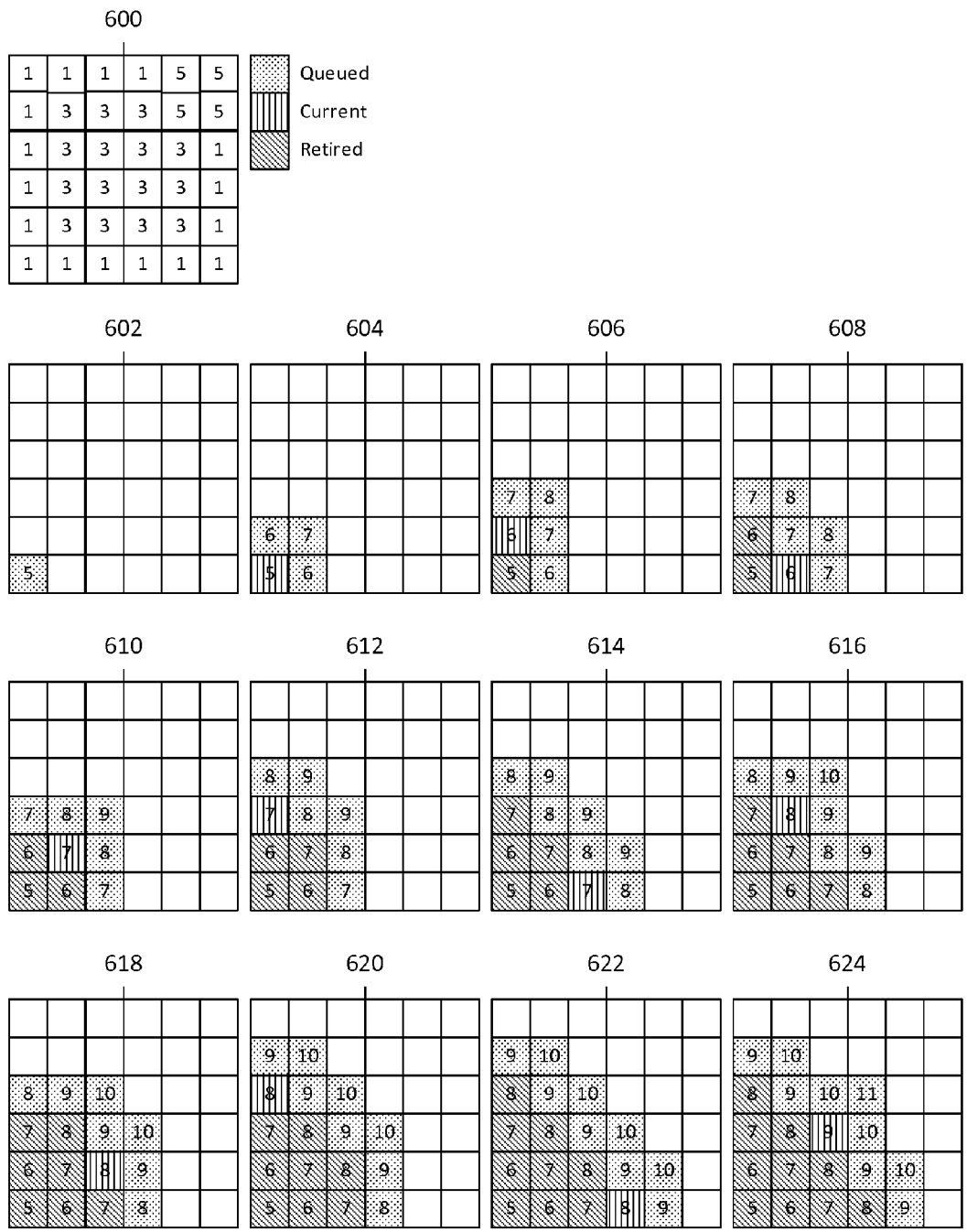
FIG. 6: Single-resolution routing example
Figure 6B:
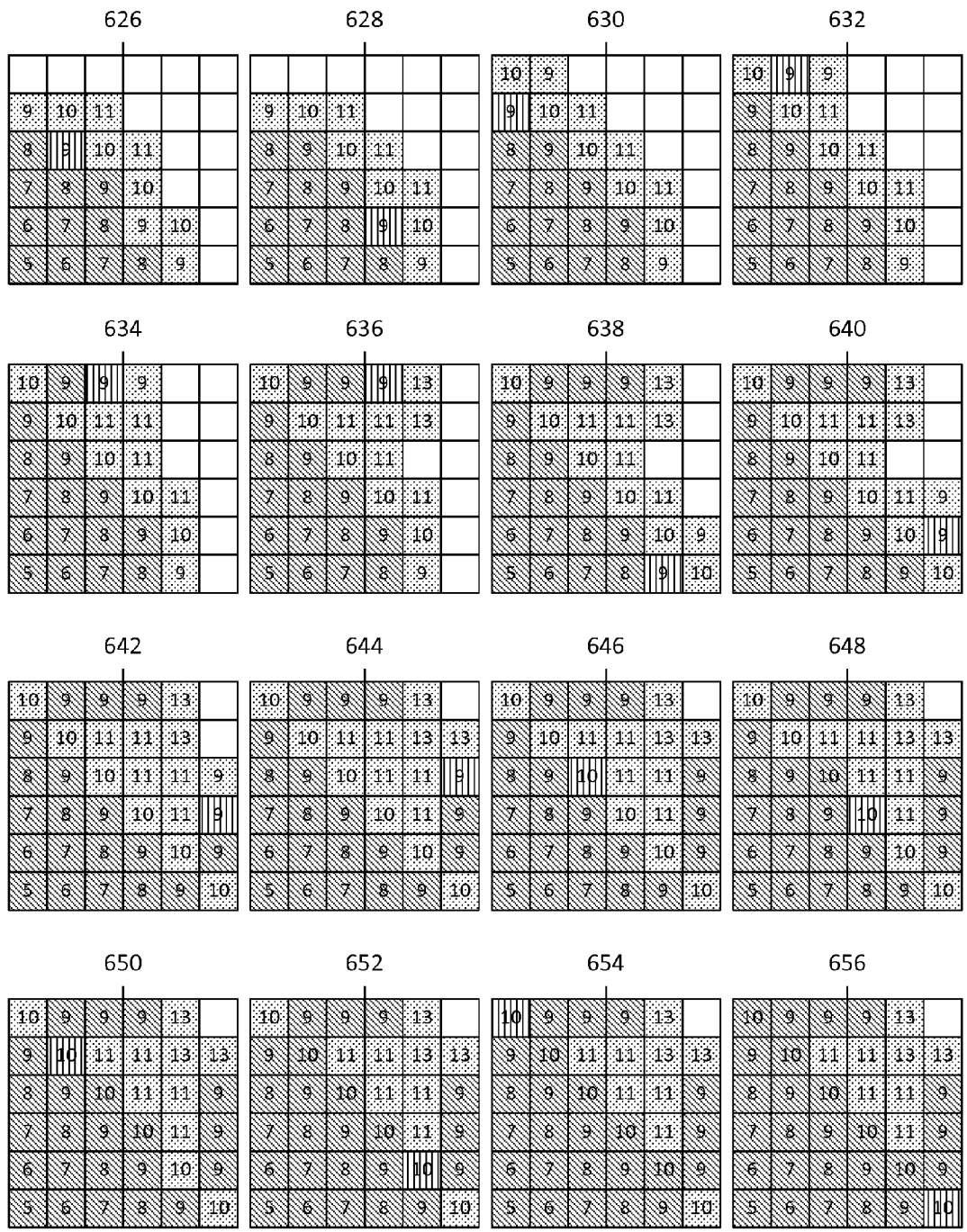
Figure 6C:
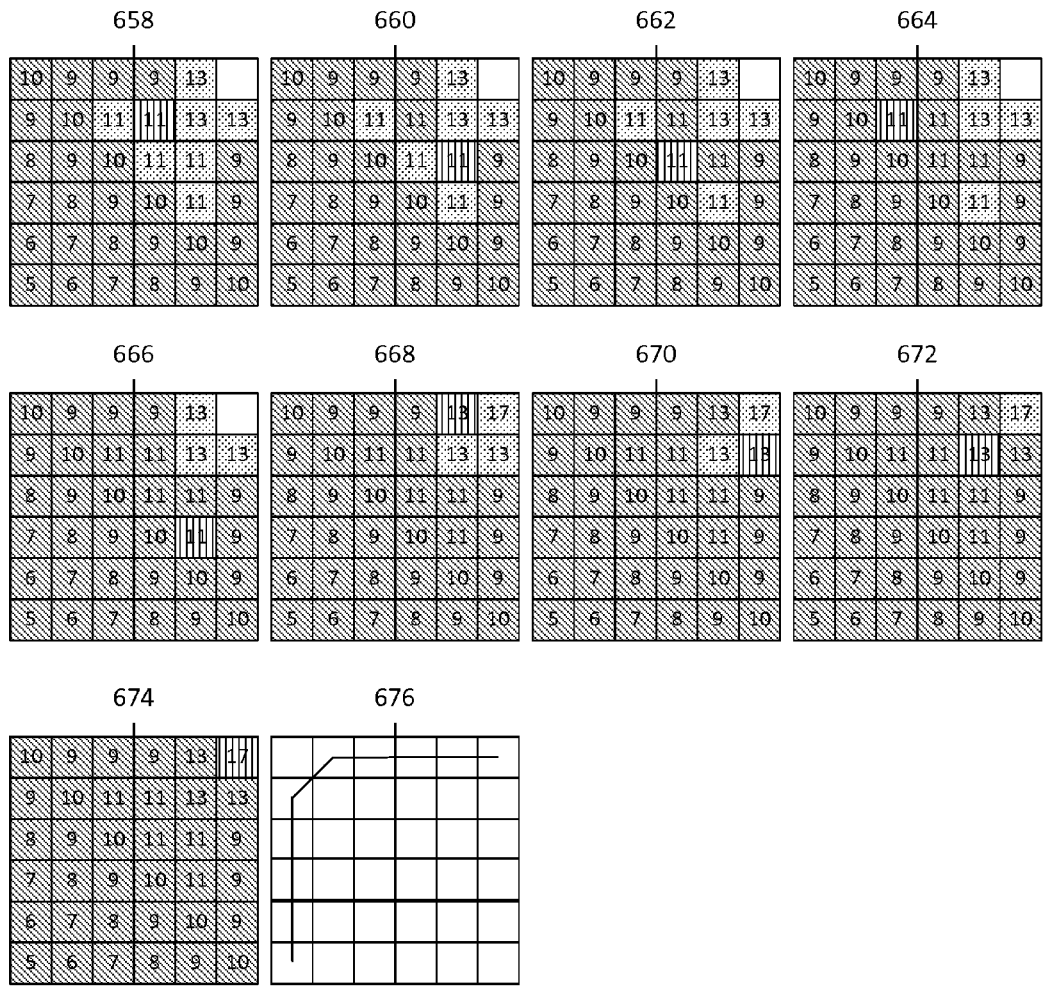

FIG. 6 shows a single-resolution routing example. The search algorithm is A*. The heuristic is:

$$\text{Heuristic}(n) = \text{distance}(n, \text{goal}) \times \text{minimum cost between adjacent nodes}$$

The cost grid 600 shows the cost of traversing each node. The lower left node (0, 0) is the start node. The upper right node (5, 5) is the goal node. Each node is connected to its eight or fewer adjacent nodes. The minimum cost between adjacent nodes is 1. This cost grid 600 represents a land cover map with low cost (1) trails along the edges, medium cost (3) grass in the middle, and high cost (5) trees in the upper right.

At step 602, the algorithm adds the start node (0, 0) to A*'s priority queue and updates its key. The cost to reach the node is 0. The distance to the goal is 5. Therefore, the node's key equals the cost to reach the goal plus the distance to the goal times the minimum cost between adjacent nodes=0+5×1=5.

At step 604, the algorithm extracts the node (0, 0) from the queue, adds each adjacent node to the queue, and updates their keys. The cost to reach node (0, 1) is 1. Its distance to the goal is 5. Therefore, the node's key equals 6. The cost to reach node (1, 1) is 3. Its distance to the goal is 4. Therefore, the node's key equals 7. The cost to reach node (1, 0) is 1. Its distance to the goal is 5. Therefore, the node's key equals 6.

At step 606, the algorithm retires node (0, 0), extracts node (0, 1), and adds nodes (0, 2) and (1, 2) to the queue.

At step 608, the algorithm retires node (0, 1), extracts node (1, 0), and adds nodes (2, 0) and (2, 1) to the queue.

At step 610, the algorithm retires node (1, 0), extracts node (1, 1), and adds node (2, 2) to the queue.

At step 612, the algorithm retires node (1, 1), extracts node (0, 2), and adds nodes (0, 3) and (1, 3) to the queue.

At step 614, the algorithm retires node (0, 2), extracts node (2, 0), and adds nodes (3, 0) and (3, 1) to the queue.

At step 616, the algorithm retires node (2, 0), extracts node (1, 2), and adds node (2, 3) to the queue.

At step 618, the algorithm retires node (1, 2), extracts node (2, 1), and adds node (3, 2) to the queue.

At step 620, the algorithm retires node (2, 1), extracts node (0, 3), and adds nodes (0, 4) and (1, 4) to the queue.

At step 622, the algorithm retires node (0, 3), extracts node (3, 0), and adds nodes (4, 0) and (4, 1) to the queue.

At step 624, the algorithm retires node (3, 0), extracts node (2, 2), and adds node (3, 3) to the queue.

At step 626, the algorithm retires node (2, 2), extracts node (1, 3), and adds node (2, 5) to the queue.

At step 628, the algorithm retires node (1, 3), extracts node (3, 1), and adds node (4, 2) to the queue.

At step 630, the algorithm retires (3, 1), extracts node (0, 4), and adds nodes (0, 5) and (1, 5) to the queue.

At step 632, the algorithm retires (0, 4), extracts node (1, 5), and adds node (2, 5) to the queue.

At step 634, the algorithm retires (1, 5), extracts node (2, 5), and adds nodes (3, 5) and (3, 4) to the queue.

At step 636, the algorithm retires (2, 5), extracts node (3, 5), and adds nodes (4, 5) and (4, 4) to the queue.

At step 638, the algorithm retires (3, 5), extracts node (4, 0), and adds nodes (5, 0) and (5, 1) to the queue.

At step 640, the algorithm retires (4, 0), extracts node (5, 1), and adds node (5, 2) to the queue.

At step 642, the algorithm retires (5, 1), extracts node (5, 2), and adds nodes (5, 3) and (4, 3) to the queue.

At step 644, the algorithm retires (5, 2), extracts node (5, 3), and adds node (5, 4) to the queue.

At step 646, the algorithm retires (5, 3) and extracts node (2, 3).

At step 648, the algorithm retires (2, 3) and extracts node (3, 2).

At step 650, the algorithm retires (3, 2) and extracts node (1, 4).

At step 652, the algorithm retires (1, 4) and extracts node (4, 1).

At step 654, the algorithm retires (4, 1) and extracts node (0, 5).

At step 656, the algorithm retires (0, 5) and extracts node (5, 0).

At step 658, the algorithm retires (5, 0) and extracts node (3, 4).

At step 660, the algorithm retires (3, 4) and extracts node (4, 3).

At step 662, the algorithm retires (4, 3) and extracts node (3, 3).

At step 664, the algorithm retires (3, 3) and extracts node (2, 4).

At step 666, the algorithm retires (2, 4) and extracts node (4, 2).

At step 668, the algorithm retires (4, 2), extracts node (4, 5), and adds node (5, 5) to the queue.

At step 670, the algorithm retires (4, 5), extracts node (5, 4).

At step 672, the algorithm retires (5, 4), extracts node (4, 4).

At step 674, the algorithm retires (4, 4) and extracts node (5, 5). This is the goal node, so the search terminates.

The result is route 676.

Figure 7:
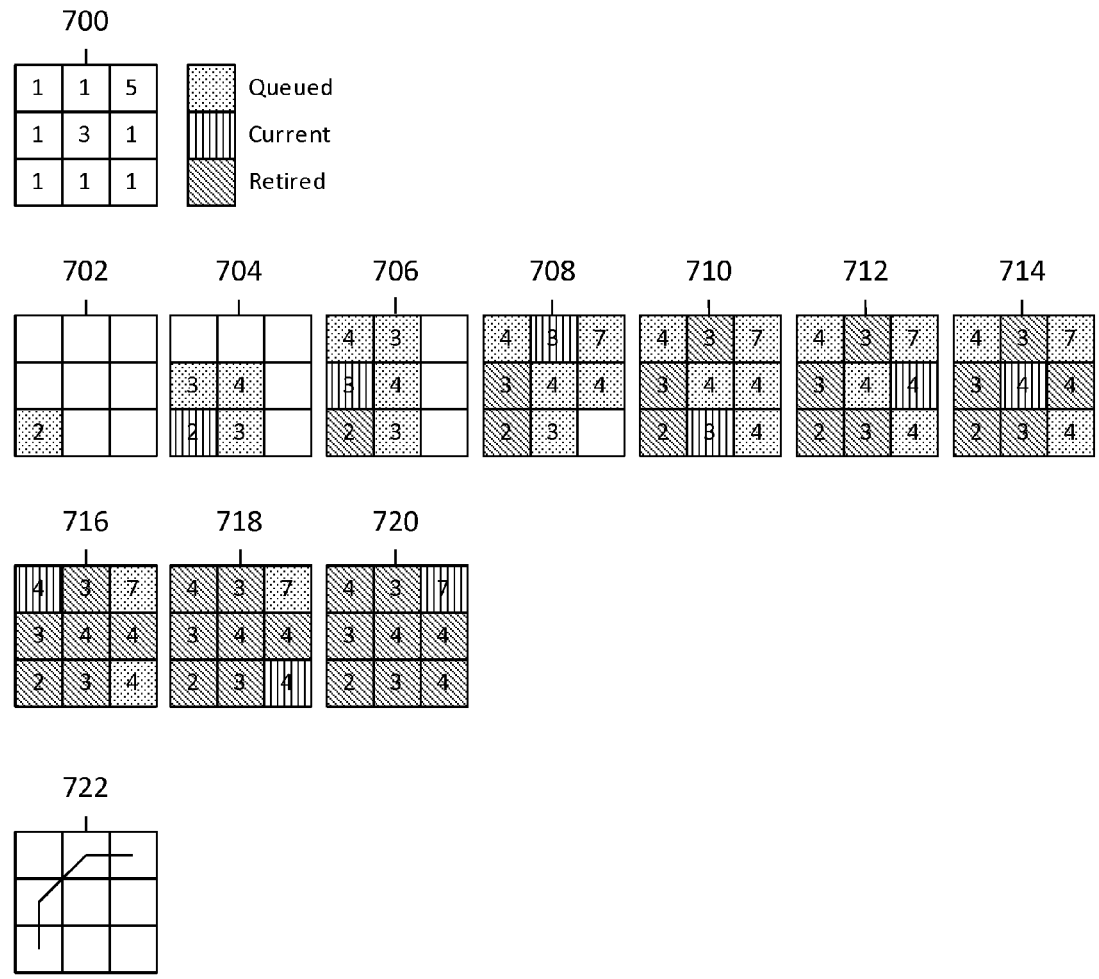
FIG. 7: Multi-resolution routing example, low resolution stage
Figure 8A:
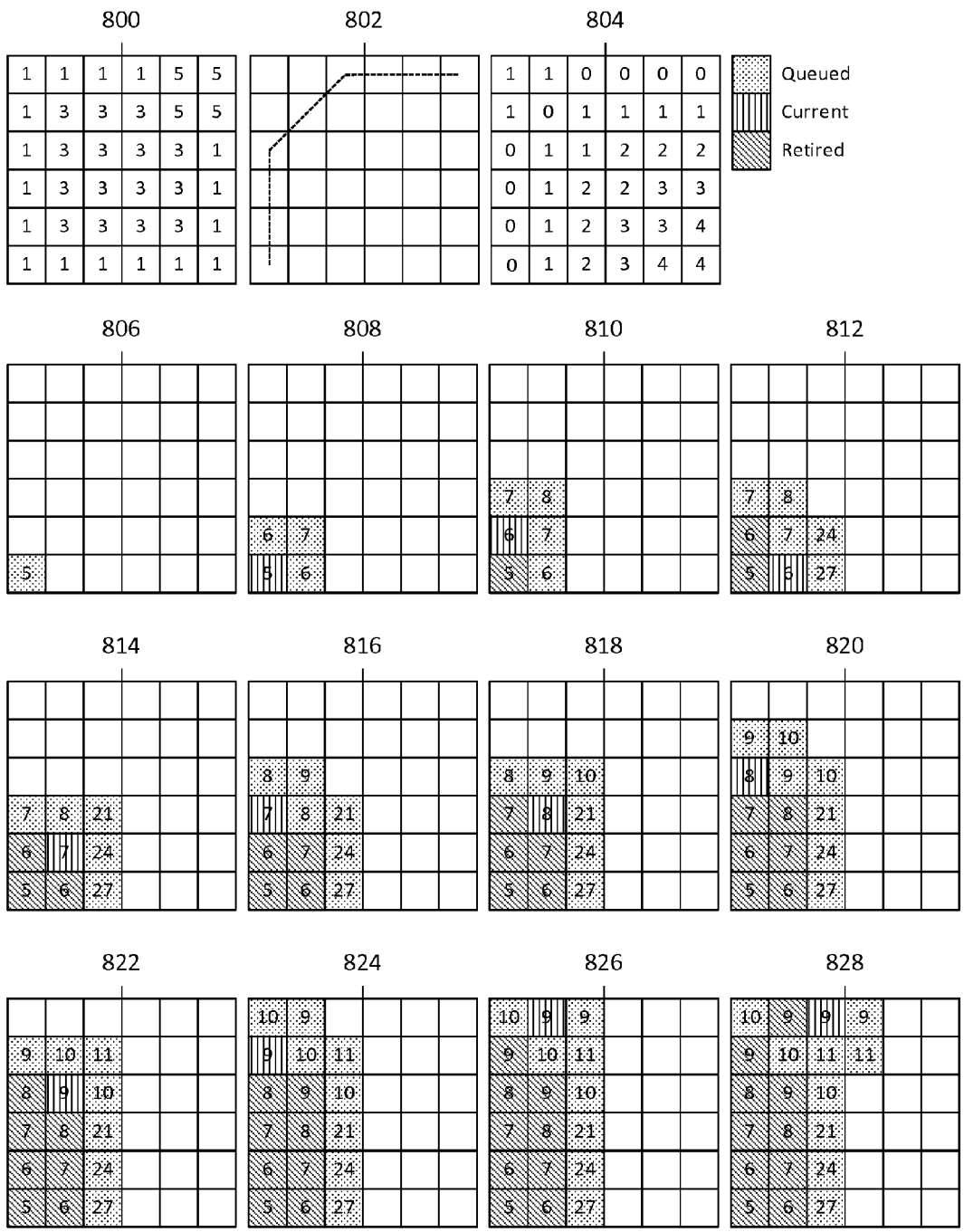
FIG. 8: Multi-resolution routing example, high resolution stage
Figure 8B:
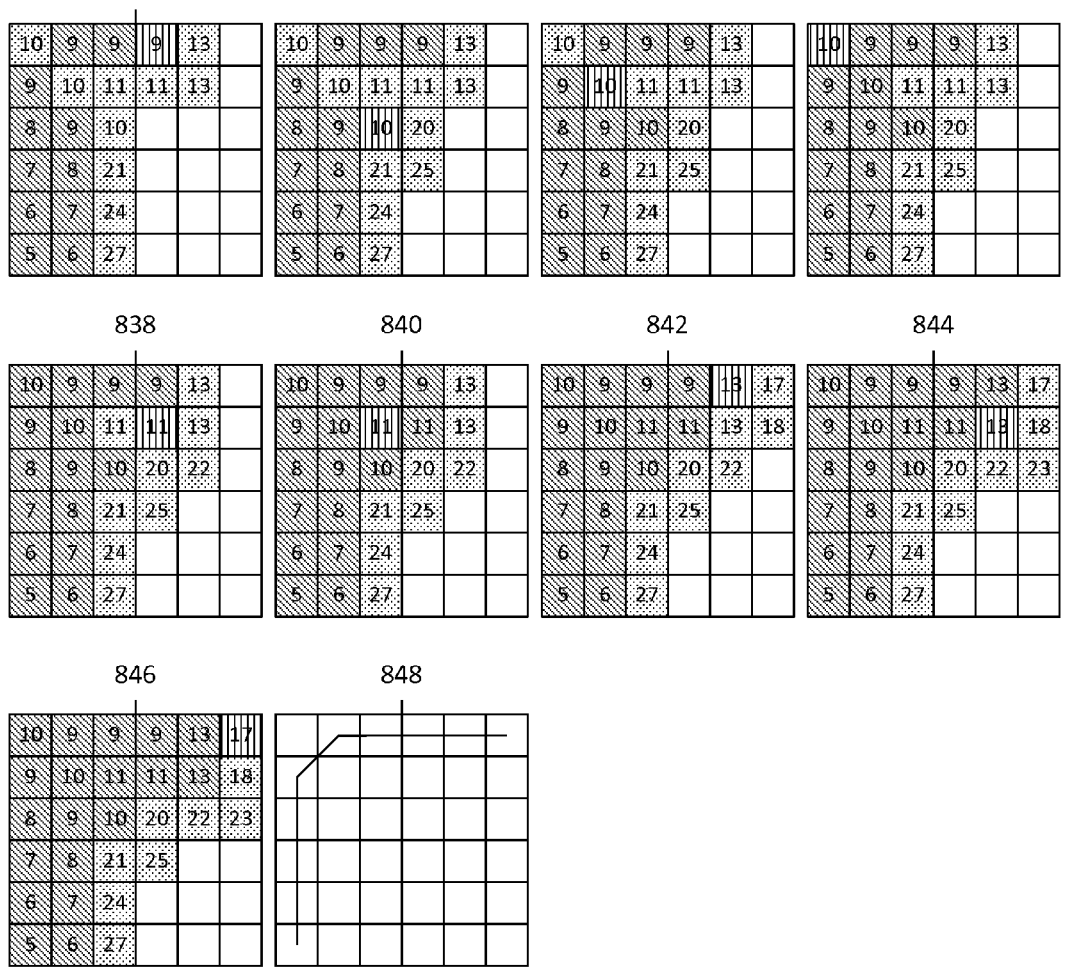

FIG. 7 and FIG. 8 show a multi-resolution routing example. FIG. 7 shows routing at a low resolution and FIG. 8 shows routing at a high resolution. At the low-resolution, the routing algorithm is the same as in the single-resolution routing example.

We start with the low-resolution routing example shown in FIG. 7.

The cost grid 700 shows the cost of traversing each node in the low-resolution map. The lower left node (0, 0) is the start node. The upper right node (2, 2) is the goal node. Each node is connected to its eight or fewer adjacent nodes. The minimum cost between adjacent nodes is 1. This cost grid 700 represents a land cover map with low cost (1) trails along the edges, medium cost (3) grass in the middle, and high cost (5) trees in the upper right. Although trails are narrow, the map generator 108 includes them at all zoom levels to improve routing at coarse zoom levels.

At step 702, the algorithm adds the start node (0, 0) to the priority queue and updates its key. The cost to reach the node is 0. The distance to the goal is 2. Therefore, the node's key equals the cost to reach the goal plus the distance to the goal times the minimum cost between adjacent nodes=$0+2\times1=2$.

At step 704, the algorithm extracts node (0, 0) from the queue, adds each adjacent node to the queue, and updates their keys. The cost to reach node (0, 1) is 1. Its distance to the goal is 2. Therefore, the node's key equals 3. The cost to reach node (1, 1) is 3. Its distance to the goal is 1. Therefore, the node's key equals 4. The cost to reach node (1, 0) is 1. Its distance to the goal is 2. Therefore, the node's key equals 3.

At step 706, the algorithm retires node (0, 0), extracts node (0, 1), and adds nodes (0, 2) and (1, 2) to the queue.

At step 708, the algorithm retires node (0, 1), extracts node (1, 2), and adds nodes (2, 2) and (2, 1) to the queue.

At step 710, the algorithm retires node (1, 2), extracts node (1, 0), and adds node (2, 0) to the queue.

At step 712, the algorithm retires node (1, 0) and extracts node (2, 1).

At step 714, the algorithm retires node (2, 1) and extracts node (1, 1).

At step 716, the algorithm retires node (1, 1) and extracts node (0, 2).

At step 718, the algorithm retires node (0, 2) and extracts node (2, 0).

At step 720, the algorithm retires node (2, 0) and extracts node (2, 2). This is the goal node, so the search terminates.

The result is low-resolution route 722.

We now proceed to the high-resolution routing example shown in FIG. 8.

The search algorithm remains A*, but now the heuristic changes to incorporate a search envelope factor:

Heuristic($n$)=distance($n$,goal)×minimum cost between adjacent nodes×search envelope factor($n$)

Where:

Search envelope factor($n$)=1+(distance($n$,bias route)/search envelope width)^2

If the search envelope factor is less than or equal to 2, the algorithm sets it to 1.

For this example, we will use a search envelope width of 1.

The cost grid 800 is the same as we used in the single-resolution routing example. This time, however, we have an additional input—the bias route 802. The bias route 802 is the one that we just generated at the low resolution. It will help to guide route generation and limit node exploration at the high resolution. The distance map 804 indicates the distance of each node from this bias route. This cost grid 800 represents a land cover map with low cost (1) trails along the edges, medium cost (3) grass in the middle, and high cost (5) trees in the upper right.

At step 806, the algorithm adds the start node (0, 0) to the priority queue and updates its key. The distance from the bias route is 0. Therefore, the node's search envelope factor equals $1+(0/1)^2=1$. The cost to reach the node is 0. The distance to the goal is 5. Therefore, the node's key equals the cost to reach the goal plus the distance to the goal times the minimum cost between adjacent nodes times the search envelope factor=$0+5\times1\times1=5$.

At step 808, the algorithm extracts node (0, 0) from the queue, adds each adjacent node to the queue, and updates their keys. The cost to reach node (0, 1) is 1. It distance to the goal is 5. Its search envelope factor is 1. Therefore, the node's key equals 6. The cost to reach node (1, 1) is 3. Its distance to the goal is 4. Its search envelope factor is 1. Therefore, the node's key equals 7. The cost to reach node (1, 0) is 1. Its distance to the goal is 5. Its search envelope factor is 1. Therefore, the node's key equals 6.

At step 810, the algorithm retires node (0, 0), extracts node (0, 1), and adds nodes (0, 2) and (1, 2) to the queue.

At step 812, the algorithm retires node (0, 1), extracts node (1, 0), and adds nodes (2, 0) and (2, 1) to the queue. This is the first case where we have encountered nodes that are outside of the one-node-wide search envelope. Nodes (2, 0) and (2, 1) both are both two nodes away from the bias route. As a result, they are penalized with high heuristic values, which result in high key values (27 and 24, respectively). For example, the cost to reach node (2, 0) from the start node is 2. Its distance to the goal node is 5. Its search envelope factor is $1+(2/1)^2=5$. Therefore, the node's key equals $2+5\times 5=27$. In this example, because nodes (2, 0) and (2, 1) have such high key values, the algorithm will terminate before extracting them.

At step 814, the algorithm retires node (1, 0), extracts node (1, 1), and adds node (2, 2) to the queue.

At step 816, the algorithm retires node (1, 1), extracts node (0, 2), and adds nodes (0, 3) and (1, 3) to the queue.

At step 818, the algorithm retires node (0, 2), extracts node (1, 2), and adds node (2, 3) to the queue.

At step 820, the algorithm retires node (1, 2), extracts node (0, 4), and adds nodes (0, 4) and (1, 4) to the queue.

At step 822, the algorithm retires node (0, 4), extracts node (1, 3), and adds node (2, 4) to the queue.

At step 824, the algorithm retires node (1, 3), extracts node (0, 4), and adds nodes (0, 5) and (1, 5) to the queue.

At step 826, the algorithm retires node (0, 4), extracts node (1, 5), and adds node (2, 5) to the queue.

At step 828, the algorithm retires node (1, 5), extracts node (2, 5), and adds nodes (3, 5) and (3, 4) to the queue.

At step 830, the algorithm retires node (2, 5), extracts node (3, 5), and adds nodes (4, 5) and (4, 4) to the queue.

At step 832, the algorithm retires node (3, 5), extracts node (2, 3), and adds nodes (3, 3) and (3, 2) to the queue.

At step 834, the algorithm retires node (2, 3) and extracts node (1, 4).

At step 836, the algorithm retires node (1, 4) and extracts node (0, 5).

At step 838, the algorithm retires node (0, 5), extracts node (3, 4), and adds node (4, 3) to the queue.

At step 840, the algorithm retires node (3, 4) and extracts node (2, 4).

At step 842, the algorithm retires node (2, 4), extracts node (4, 5), and adds nodes (5, 5) and (5, 4) to the queue.

At step 844, the algorithm retires node (4, 5), extracts node (4, 4), and adds node (5, 3) to the queue.

At step 846, the algorithm retires node (4, 4) and extracts node (5, 5). This is the goal node, so the search terminates.

The result is high-resolution route 848.

In these examples, the single-resolution and multi-resolution routing systems produced identical routes. The single-resolution routing system expanded 36 nodes. The multi-resolution routing system expanded 9 nodes in the low-resolution map and 20 nodes in the high-resolution map for a total of 29 expanded nodes. That is a performance savings of 19%. In addition, the multi-resolution system had to store at most 20 nodes in memory whereas the single-resolution system had to store at most 36 nodes in memory. That is a memory savings of 44%.

In a practical test planning 100 random zero to ten kilometer off-road routes at Yosemite National Park, the search envelope improved performance by 37% and reduced memory consumption by 72%.

The above-described devices and subsystems of the exemplary embodiments of FIGS. 1 to 8 can include, for example, any suitable servers, workstations, PCs, laptop computers, PDAs, Internet appliances, handheld devices, cellular telephones, wireless devices, other electronic devices, and the like, capable of performing the processes of the exemplary embodiments of FIGS. 1 to 8. The devices and subsystems of the exemplary embodiments of FIGS. 1 to 8 can communicate with each other using any suitable protocol and can be implemented using one or more programmed computer systems or devices.

One or more interface mechanisms can be used with the exemplary embodiments of FIGS. 1 to 8, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, 3 G communications networks, Public Switched Telephone Network (PSTNs), Packet Data Networks (PDNs), the Internet, intranets, WiMax Networks, a combination thereof, and the like.

It is to be understood that the devices and subsystems of the exemplary embodiments of FIGS. 1 to 8 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1 to 8 can be implemented via one or more programmed computer systems or devices.

To implement such variations as well as other variations, a single computer system can be programmed to perform the special purpose functions of one or more of the devices and subsystems of the exemplary embodiments of FIGS. 1 to 8. On the other hand, two or more programmed computer systems or devices can be substituted for any one of the devices and subsystems of the exemplary embodiments of FIGS. 1 to 8. Accordingly, principles and advantages of distributed processing, such as redundancy, replication, and the like, also can be implemented, as desired, to increase the robustness and performance the devices and subsystems of the exemplary embodiments of FIGS. 1 to 8.

The devices and subsystems of the exemplary embodiments of FIGS. 1 to 8 can store information relating to various processes described herein. This information can be stored in one or more memories, such as a hard disk, optical disk, magneto-optical disk, RAM, and the like, of the devices and subsystems of the exemplary embodiments of FIGS. 1 to 8. One or more databases of the devices and subsystems of the exemplary embodiments of FIGS. 1 to 8 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1 to 8 can include appropriate data structures for storing data collected and/or generated by the processes of the devices and subsystems of the exemplary embodiments of FIGS. 1 to 8 in one or more databases thereof.

All or a portion of the devices and subsystems of the exemplary embodiments of FIGS. 1 to 8 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1 to 8 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1 to 8, for driving the devices and subsystems of the exemplary embodiments of FIGS. 1 to 8, for enabling the devices and subsystems of the exemplary embodiments of FIGS. 1 to 8 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1 to 8. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1 to 8 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather covers various modifications and equivalent arrangements, which fall within the purview of the appended claims.

The invention claimed is:

1. A system for generating a travel route comprising:
one or more computer processors configured to perform the functions of:
a map generator that generates maps at multiple detail levels; and
a route generator that generates a complete higher detail route based upon one or more complete lower detail routes,
wherein the route generator favors candidate complete higher detail routes that fall within a search envelope surrounding the complete lower detail routes, and
the one or more computer processors are configured to display the generated maps and generated routes to a user on a display device.

2. The system of claim 1, wherein the route generator uses a graph search biased toward nodes that are closer to the complete lower detail routes.

3. The system of claim 1, wherein the search envelope's dimensions depend on a current detail level.

4. The system in claim 1, further comprising a heuristic generator that favors the candidate complete higher detail routes that are near the complete lower detail routes.

5. The system of claim 1, wherein the map generator enlarges map features at lower detail levels to improve routing.

6. A method for generating a travel route, the method comprising:
one or more computer processors configured to perform the steps of:
generating by a map generator maps at multiple detail levels; and
generating by a route generator a complete higher detail route based upon one or more complete lower detail routes,
wherein the route generator favors candidate complete higher detail routes that fall within a search envelope surrounding the complete lower detail routes, and
the one or more computer processors are configured to display the generated maps and generated routes to a user on a display device.

7. The method of claim 6, wherein the route generator uses a graph search biased toward nodes that are closer to the complete lower detail routes.

8. The method of claim 6, wherein the search envelope's dimensions depend on a current detail level.

9. The method of claim 6, wherein a heuristic generator favors the candidate complete higher detail routes that are near the complete lower detail routes.

10. The method of claim 6, wherein the map generator enlarges map features at lower detail levels to improve routing.

11. A computer program product for generating a travel route and including one or more computer readable instructions embedded on a tangible computer readable medium and configured to cause one or more computer processors to perform the steps of:
generating by a map generator maps at multiple detail levels; and generating by a route generator a complete higher detail route based upon one or more complete lower detail routes, wherein the route generator favors candidate complete higher detail routes that fall within a search envelope surrounding the complete lower detail routes, and the one or more computer processors are configured to display the generated maps and generated routes to a user on a display device.

12. The computer program product of claim 11, wherein the route generator uses a graph search biased toward nodes that are closer to the complete lower detail routes.

13. The computer program product of claim 11, wherein the search envelope's dimensions depend on a current detail level.

14. The computer program product of claim 11, wherein a heuristic generator favors the candidate complete higher detail routes that are near the complete lower detail routes.

15. The computer program product of claim 11, wherein the map generator enlarges map features at lower detail levels to improve routing.

* * * * *